United States Patent
Hung et al.

(10) Patent No.: US 7,239,812 B2
(45) Date of Patent: Jul. 3, 2007

(54) PLUGGABLE BI-DIRECTIONAL TRANSCEIVER WITH A SINGLE OPTICAL FIBER

(75) Inventors: Tuan-Yu Hung, Hsinchu (TW); Chang-You Li, Chiayi (TW); Jung-Te Ting, Taisi Township, Yunlin County (TW); Ling-Ying Chiang, Hsinchu (TW); Wen-Chih Hsieh, Jhudong Township, Hsinchu County (TW); Ing-Jer Ho, Hsinchu (TW)

(73) Assignee: APAC Opto Electronics Inc., Hsinchu County (TW)

(*) Notice: Subject to any disclaimer, the term of this patent is extended or adjusted under 35 U.S.C. 154(b) by 595 days.

(21) Appl. No.: 10/788,934

(22) Filed: Feb. 27, 2004

(65) Prior Publication Data
US 2005/0117913 A1    Jun. 2, 2005

(30) Foreign Application Priority Data
Nov. 27, 2003    (TW) ............................. 92221003 U

(51) Int. Cl.
*H04B 10/00* (2006.01)
*G02B 6/36* (2006.01)
*G02B 6/44* (2006.01)

(52) U.S. Cl. .............. 398/135; 398/138; 398/139; 398/164; 385/53; 385/102

(58) Field of Classification Search ............. 398/135, 398/138, 139, 164; 385/53, 55, 56, 60, 92, 385/102
See application file for complete search history.

(56) References Cited

U.S. PATENT DOCUMENTS

| | | | |
|---|---|---|---|
| 6,771,511 B2* | 8/2004 | Bui ............................ 361/728 |
| 6,954,592 B2* | 10/2005 | Tan et al. .................... 398/138 |
| 7,033,191 B1* | 4/2006 | Cao ............................ 439/160 |
| 2003/0198025 A1* | 10/2003 | Cao ............................ 361/728 |

* cited by examiner

*Primary Examiner*—Dalzid Singh

(57) ABSTRACT

A pluggable bi-directional transceiver with a single optical fiber comprises a sub-assembly module, a circuit board, a main frame, an upper cover, a lower cover, a tab-base and a tab, connected to a communication equipment. The sub-assembly module connected to a single optical fiber includes a WDM, which reflects or transmits a specific wavelength optical signal adapted to function in receiving and transmitting optical signal. The circuit board exchanges the signal of the sub-assembly module with the communication equipment. The main frame and the upper and lower covers are used to fix and protect elements. The tab and tab-base are used to fix the transceiver on the equipment or remove from it. The specifications of the transceiver follow the small form-factor pluggable transceiver multi-source agreement.

11 Claims, 5 Drawing Sheets

PLUGGABLE BI-DIRECTIONAL TRANSCEIVER WITH A SINGLE OPTICAL FIBER

FIELD OF THE INVENTION

This invention relates generally to the structure of a bi-directional transceiver, more specifically, it relates to a pluggable bi-directional transceiver with a single optical fiber.

BACKGROUND OF THE INVENTION

Due to great progress and popularity of communication technology, the multiplex and high-load optical communication system is widely applied in broadband networks and/or cable TV recently. In an optical communication system, an optical transmitter is in charge of transmitting an optical signal converted from an electric signal, and an optical receiver is supposed to receive an optical signal and relay it to some next stage for being converted into a corresponding electric signal.

Generally speaking, it is more advantageous to integrate an optical receiver and an optical transmitter in a single module to become an optical transceiver for bi-directional operation. FIG. 1 is a schematic view showing an optical bi-directional transceiver system containing double optical fibers, in which a first and a second bi-directional optical transceiver 11a/11b are disposed respectively at each of two ends of the transceiver system, in which a first and a second optical transmitter 13a/13b are responsible for transmitting optical signals while a first and a second optical receiver 14a/14b are responsible for receiving optical signals. As those two bi-directional optical transceivers communicate with each other through a first and a second optical fiber 12a/12b, in which each fiber is in charge of a unidirectional transmission only, therefore, the facility expenditure is more or less uneconomical.

On the other hand, because the application of optical communication system, particularly, a portable and pluggable mini-size optical transceiver to be combined with a personal computer (PC) or a communication equipment, is gradually spread into the field of personal use, a Small Form-Factor Pluggable Transceiver Multi-source Agreement is established as the protocols for regulating the specifications of a mini-size pluggable optical transceiver, an electronic connecting system of optical transceiver, and the layout of motherboard.

SUMMARY OF THE INVENTION

The primary object of this invention is to provide a pluggable bi-directional transceiver with a single optical fiber in conformity with the Small Form-Factor Pluggable Transceiver Multi-source Agreement. This invention comprises a sub-assembly module of optical transceiver, a printed circuit board (PCB), a main frame, an upper cover, a lower cover, a tab, and a tab-base. One end of the sub-assembly module is connected with an optical fiber while the other with the PCB, and the sub-assembly module is provided with a wavelength division multiplexer (WDM) capable of separating optical signals of different wavelengths and, hence, only an optical fiber is required for transmitting and receiving optical signals. In practice, an optical signal is provided to the sub-assembly module through the fiber and converted into an electronic signal in the module, then delivered to an electronic machine or a communication equipment through the PCB. In reverse, an electronic signal from an electronic machine or a communication equipment is delivered to the sub-assembly module via the PCB, then, transmitted outwardly through the single optical fiber. The main frame is located in a space between the covers, and all the main frame, the upper cover, and the lower cover are made in metal so that the sub-assembly module, the PCB, and inside elements could be protected, and EMI could be prevented. The tab together with the tab-base is connected with the main frame so that it is possible to realize an easy fixing or pulling of the entire optical transceiver onto or out of a communication equipment.

For more detailed information regarding advantages or features of this invention, at least an example of preferred embodiment will be described below with reference to the annexed drawings.

BRIEF DESCRIPTION OF THE DRAWINGS

The related drawings in connection with the detailed description of this invention to be made later are described briefly as follows, in which.

DETAILED DESCRIPTION OF THE PREFERRED EMBODIMENTS

Figure 1:
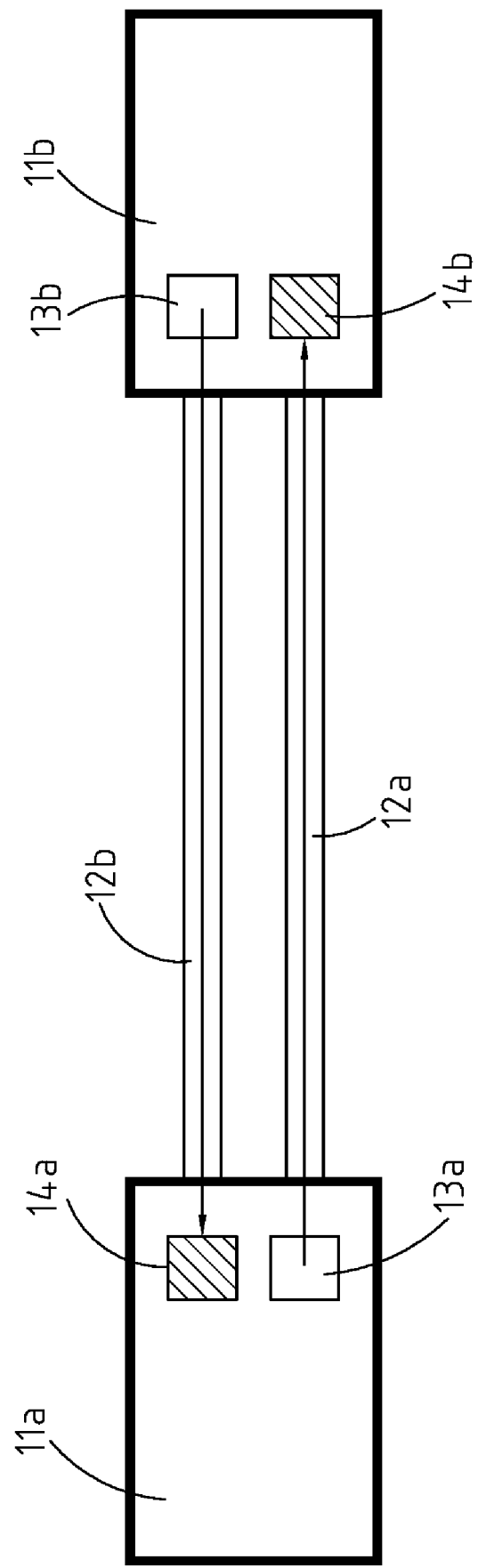
FIG. 1 is a schematic view of a conventional bi-directional optical transceiver system using double optical fibers.
Figure 2:
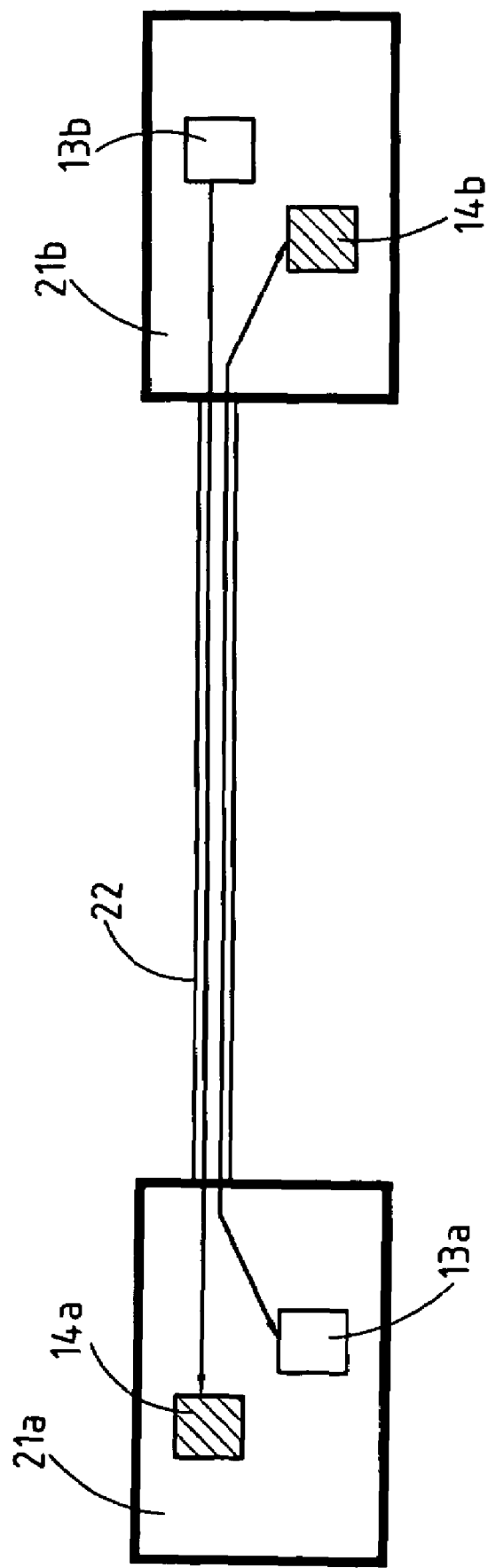
FIG. 2 is a schematic view of a bi-directional transceiver system with a single optical fiber.

FIG. 2 is a schematic view showing a bi-directional transceiver system with a single optical fiber. As shown in the figure, transmission of an optical signal is performed through a single fiber between a first and a second bi-directional optical transceiver 21a/21b, in which an electronic signal is converted into an optical signal by a first optical transmitter 13a and transmitted through a single fiber 22 to a second optical receiver 14b at the other end, then converted back into an electronic signal again. Similarly, an optical signal is transmitted from a second optical transmitter 13b to a first optical receiver 14a of the first bi-directional optical transceiver 21a also through the single fiber 22. Since, there is only a single fiber needed in such a transmitting operation, it is possible to fully make use of the optical fiber and reduce installation expenditure thereof significantly.

Figure 3:
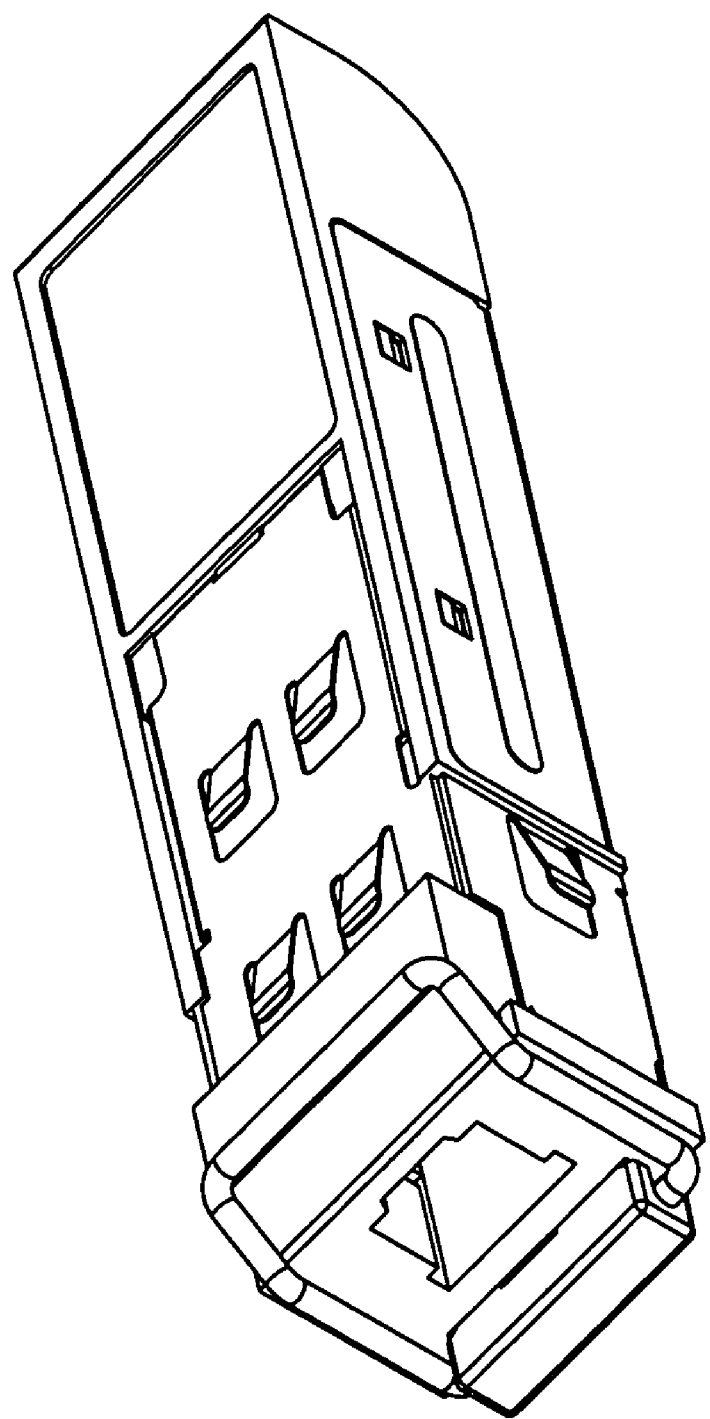
FIG. 3 is a three-dimensional view of a bi-directional transceiver with a single optical fiber of this invention.
Figure 4:
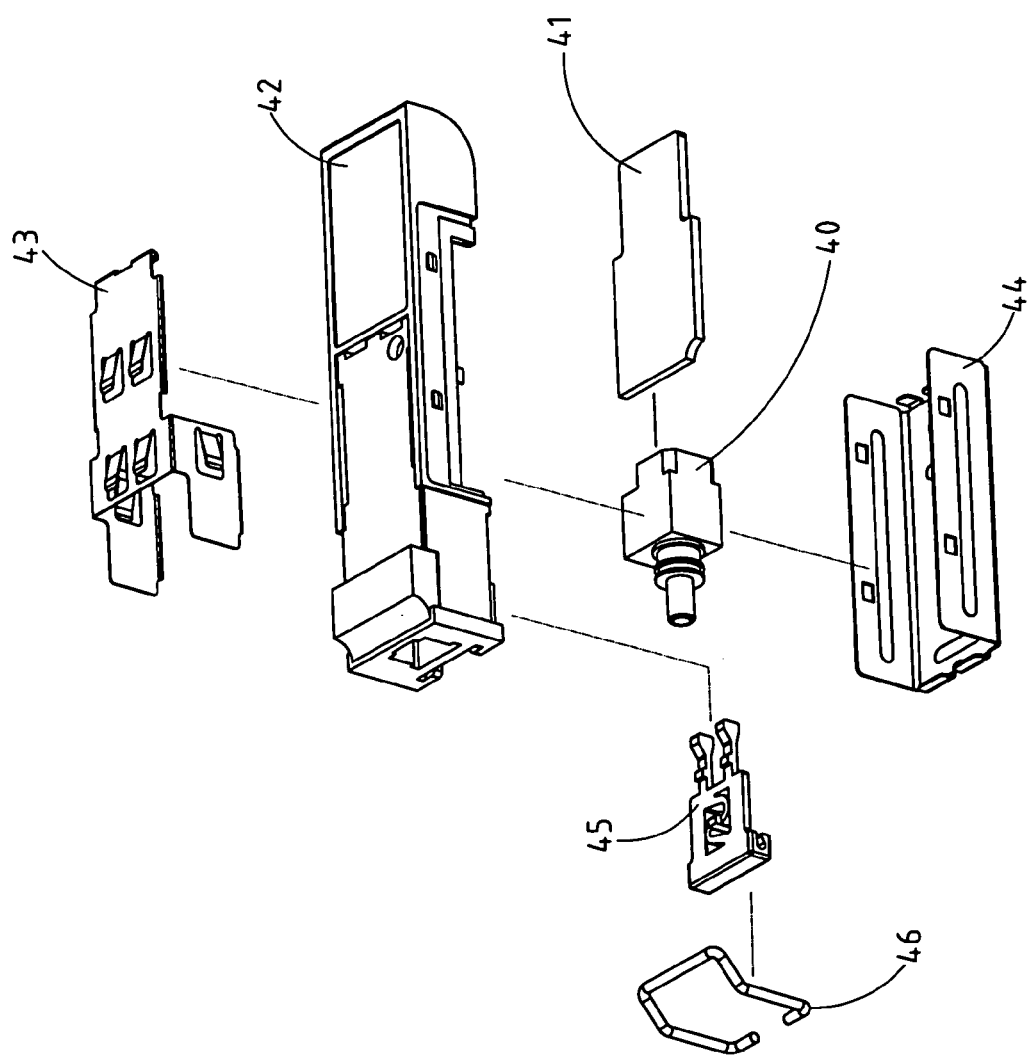
FIG. 4 is a structural schematic view of the bi-directional transceiver with a single optical fiber of this invention.

FIG. 3 is a three-dimensional view of a bi-directional transceiver with a single optical fiber of this invention. As illustrated in FIG. 3, the cladding of an optical fiber is metallic for prevention of electromagnetic interference (EMI). FIG. 4 is a structural schematic view of the pluggable bi-directional transceiver with a single optical fiber of this invention. The entire optical transceiver is connected with a communication equipment under pluggable condition. A sub-assembly module 40 of the optical transceiver containing a wavelength division multiplexer (WDM) is located in the central portion of the transceiver and connected with an optical fiber for bi-directional transmission of optical signals and conversion of optical signals into electronic signals or vice versa A printed circuit board (PCB) 41 is connected with the sub-assembly module 40 of the optical transceiver for connecting and exchanging electronic signals of the latter with a communication equipment. In operation, the rear end of the PCB 41 is directly plugged into a mother base of an electronic machine, or pulled out if not in use. A tab 46 hitches a tab-base 45 and is fixed together with the sub-assembly module 40 and the PCB 41 inside a space enclosed by a main frame 42 and a lower cover 44, where the main frame 42 is an EMI-preventable lightweight zinc alloy positioned above the sub-assembly module 40 and the PCB 41. The lower cover 44 is a metallic cover located under the sub-assembly module 40 and the PCB 41 for accommodating both the same thereon. The tab-base 45, which is connected with the main frame 42, is a plastic base, in which an anchoring member is arranged at the front edge thereof to be fastened to the housing of a communication equipment when an entire optical transceiver is plugged into the equipment. The tab 46, which hitches the tab-base 45, is prepared to make an easy drawing of the entire optical transceiver out of a communication equipment. Moreover, a metallic upper cover 43 is located above the main frame 42 for preventing EMI and protecting the main frame.

Figure 5:
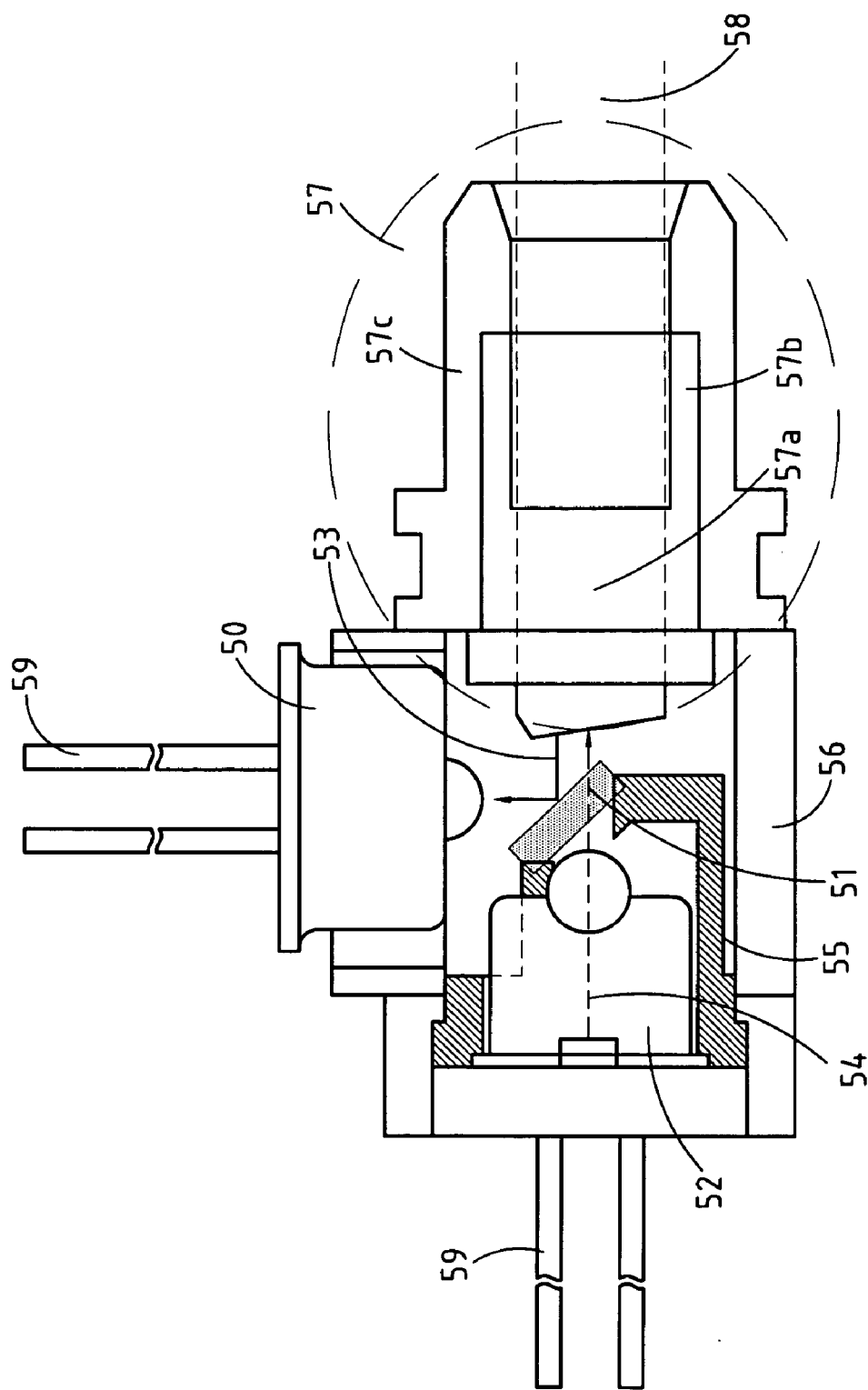
FIG. 5 is a structural schematic view showing a subassembly module of optical transceiver.

FIG. 5 is a structural schematic view showing a subassembly module of optical transceiver. The sub-assembly module of this invention is comprised of a laser-diode transmitter 52, a signal receiver 50, a wavelength division multiplexer (WDM) 51, a supporting rack 55, a casing 56, an optical-fiber connector 57, and a lead wire 59. A lens device is provided to the laser-diode transmitter 52 and the signal receiver 50 for enhancing coupling efficiency, and an electronic signal given by the lead wire 59 is converted into an optical signal 54 by the laser-diode transmitter 52, and transmitted outwardly through the WDM 51, then an optical fiber 58.

An input optical signal 53 is inputted through the optical fiber 58 and the WDM 51, then reflected to arrive at the signal receiver 50 and converted into an electronic signal, then transmitted via the lead wire 59. The lead wire 59 is arranged in connection with the conductive pins of the PCB for intercommunication of signals. The supporting rack 55 is a plastic rack with a smaller thermal expansion coefficient relative to that of metal for minimizing the displacement of the WDM 51 incurred by the phenomenon of thermal expansion and contract, and thereby heightening the coupling efficiency accordingly.

The WDM 51, which could be an optical filter, would function to reflect the optical signal having a designated wavelength and allow the otherwise to transmit for dividing the optical signals in different wavelengths.

The optical-fiber connector 57, which is connected with the optical fiber 58 for guiding optical signals, is comprised of a fiber-guiding tube 57a, a ceramic sheath 57b, and a metallic sleeve 57c, in which the fiber-guiding tube 57a in connection with the optical fiber 58 is disposed at a tail end of the fiber for guiding the optical signals to be transmitted; the ceramic sheath 57b encloses the fiber-guiding tube 57a and a short segment of the tail end of the fiber 58; and the metallic sleeve 57c encloses the ceramic sheath 57b to reinforce the mechanical strength of the entire optical-fiber connector 57. Furthermore, the casing 56 is generally a metallic shell for protecting and fixing inside elements.

In short, the pluggable bi-directional transceiver with a single optical fiber of this invention does follow the Small Form-Factor Pluggable Transceiver Multi-source Agreement and is applicable to communication equipments or personal computers. Also, it is possible to cut down the installation expenditure of a communication equipment due to a single optical fiber, which is substituted for the conventional double fibers for bi-directional signal transmission.

In the above described, at least one preferred embodiment has been described in detail with reference to the drawings annexed, and it is apparent that numerous changes or modifications may be made without departing from the true spirit and scope thereof, as set forth in the claims below.

What is claimed is:

1. A pluggable bi-directional transceiver with a single optical fiber, comprising:

a sub-assembly module of optical transceiver connected with an optical fiber for receiving and transmitting optical signals, said sub-assembly module comprising an optical fiber as a medium for transmitting optical signals, a laser-diode transmitter for converting electronic signals into optical signals and transmitting the optical signals outwardly, a signal receiver for receiving and converting optical signals into electronic signals, a wavelength division multiplexer (WDM) located among said laser-diode transmitter, said signal receiver, and said optical fiber for separating optical signals of different wavelengths, a supporting rack for supporting said WDM, a casing for fixing and protecting said laser-diode transmitter, said signal receiver, and said WDM, and an optical-fiber connector connected with said optical fiber;

a printed circuit board (PCB) connected with said sub-assembly module, and also connected with a communication equipment under a pluggable condition for exchange of signals between said sub-assembly module and said communication equipment;

a main frame located above said sub-assembly module and said PCB for fixing and protecting said sub-assembly module and said PCB;

a tab for pulling said transceiver out of said communication equipment;

a tab-base provided with an anchoring member for fixing said transceiver onto said communication equipment;

a lower cover located under said sub-assembly module and said PCB for fixing and protecting said sub-assembly module and said PCB; and an upper cover located above said main frame;

wherein said optical-fiber connector of said sub-assembly module further comprises a fiber-guiding tube, a ceramic sheath and a metallic sleeve, said fiber-guiding tube being located at a tail end of said optical fiber and connected with said optical fiber; said ceramic sheath enclosing said fiber-guiding tube, and said metallic sleeve enclosing said ceramic sheath.

2. The transceiver according to claim 1, wherein said laser-diode transmitter of said sub-assembly module is provided with a lens device.

3. The transceiver according to claim 1, wherein said laser-diode transmitter of said sub-assembly module is provided with a lead wire for connecting with conductive pins of said PCB.

4. The transceiver according to claim 1, wherein said signal receiver of said sub-assembly module is provided with a lens device.

5. The transceiver according to claim 1, wherein said signal receiver of said sub-assembly module is provided with a lead wire for connecting with conductive pins of said PCB.

6. The transceiver according to claim 1, wherein said supporting rack of said sub-assembly module is made of a plastic material.

7. The transceiver according to claim 1, wherein said casing of said sub-assembly module is made of a metallic material.

8. The transceiver according to claim 1, wherein said main frame is made of a zinc alloy for, preventing electromagnetic interference (EMI).

9. The transceiver according to claim 1, wherein said lower cover is made of a metallic material for preventing EMI.

10. The transceiver according to claim 1, wherein said upper cover is made of a metallic material for preventing EMI.

11. The transceiver according to claim 1, wherein said tab-base is made of a plastic material.

* * * * *